(12) United States Patent  
Grover et al.

(10) Patent No.: US 8,581,842 B2  
(45) Date of Patent: Nov. 12, 2013

(54) DETECTION OF A ROLLING MOTION OR SLIDING MOTION OF A BODY PART ON A SURFACE

(75) Inventors: Douglas Max Grover, Westminster, CO (US); Paul Roller Michaelis, Louisville, CO (US); David S. Mohler, Arvada, CO (US); Richard L. Robinson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 667 days.

(21) Appl. No.: 12/689,493

(22) Filed: Jan. 19, 2010

(65) Prior Publication Data

US 2011/0175807 A1   Jul. 21, 2011

(51) Int. Cl.
*G06F 3/033* (2013.01)
*G09G 5/08* (2006.01)

(52) U.S. Cl.
USPC .......................................... 345/157; 345/173

(58) Field of Classification Search
USPC ........... 345/156, 157, 163, 173, 174; 382/100
See application file for complete search history.

(56) References Cited

U.S. PATENT DOCUMENTS

| | | | |
|---|---|---|---|
| 5,229,764 A | 7/1993 | Matchett et al. | |
| 5,420,936 A | 5/1995 | Fitzpatrick et al. | |
| 6,057,540 A | 5/2000 | Gordon et al. | |
| 6,278,443 B1 | 8/2001 | Amro et al. | |
| 6,400,836 B2 | 6/2002 | Senior | |
| 6,924,793 B2 | 8/2005 | Sharma | |
| 6,941,001 B1 | 9/2005 | Bolle et al. | |
| 7,239,304 B2 | 7/2007 | Hoshino et al. | |
| 7,839,383 B2 | 11/2010 | Li et al. | |
| 2002/0030668 A1 | 3/2002 | Hoshino et al. | |
| 2003/0038824 A1 | 2/2003 | Ryder | |
| 2004/0042645 A1 | 3/2004 | Wang | |
| 2005/0134427 A1 | 6/2005 | Hekimian | |
| 2005/0219200 A1 | 10/2005 | Weng | |
| 2008/0158170 A1 | 7/2008 | Herz et al. | |
| 2009/0152343 A1 | 6/2009 | Carter et al. | |
| 2009/0169070 A1 | 7/2009 | Fadell | |
| 2010/0277428 A1 | 11/2010 | Kumazawa | |

FOREIGN PATENT DOCUMENTS

| | | |
|---|---|---|
| CN | 1732507 | 2/2006 |
| CN | 201156246 | 11/2008 |
| EP | 0905646 | 3/1999 |
| EP | 0973123 | 1/2000 |

OTHER PUBLICATIONS

Sugiura, A. and Koseki, Y., "A User Interface Using Fingerprint Recognition—Holding Commands and Data Objects on Fingers," C&C Media Research Laboratories, NEC Corporation, UIST '98, San Francisco, California, pp. 71-79.

(Continued)

*Primary Examiner* — Ricardo L Osorio  
(74) *Attorney, Agent, or Firm* — Sheridan Ross P.C.

(57) ABSTRACT

An optical scanner scans a first portion of a print of a body part such as a finger in a first area of an optical surface. The optical scanner detects a motion of the body part to a second area of the optical surface. This can be done in various ways. One way is for the optical scanner to detect a sliding motion of the body part to determine if most of the first portion of the print is in the second area. Another way is for the optical scanner to determine a rolling motion of the print based on a continuity of the print from the first area to the second area. A similar system and method is disclosed which detects a rolling motion of a body part by using a sleeve with multiple properties.

14 Claims, 8 Drawing Sheets

(56) References Cited

OTHER PUBLICATIONS

Marsal, K., "Apple Looks to Take Multi-Touch Beyond the Touch-Screen," AppleInsider, website: "http://www.appleinsider.com/articles/08/09/04/apple_looks_to_take_multi_touch_beyond_...," Printed Mar. 10, 2010, 8 pages.

Oliver, S., "Apple Looks Towards Fingerprint-Based Multi-Touch Controls," AppleInsider, website: "http://www.appleinsider.com/articles/09/07/02/apple_looks_towards_fingerprint_based_m...," Printed Mar. 10, 2010, 6 pages.

Combined Search Report and Examination Report for UK Patent Application No. GB1021665.3, dated Feb. 28, 2012.

Combined Search Report and Examination Report for UK Patent Application No. GB1021665.3, dated Apr. 21, 2011.

Official Action for UK Patent Application No. GB1021665.3, dated Nov. 9, 2012, 4 pages.

Official Action (with English translation) for Chinese Patent Application No. 201010622672.8 dated Apr. 1, 2013, 14 pages.

Official Action for United Kingdom Patent Application No. GB1021665.3, dated Apr. 9, 2013, 4 pages.

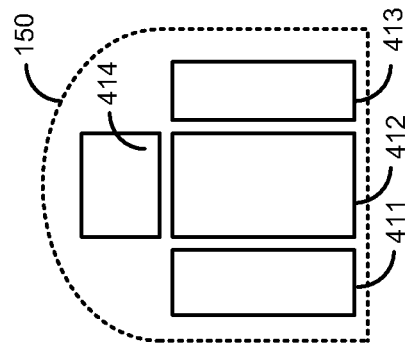
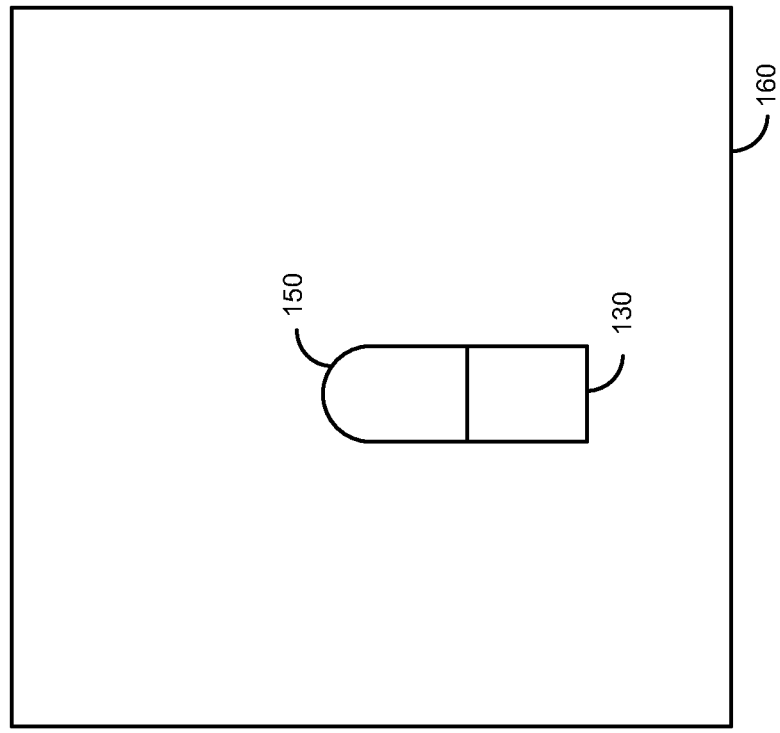

DETECTION OF A ROLLING MOTION OR SLIDING MOTION OF A BODY PART ON A SURFACE

TECHNICAL FIELD

The system and method relates to detection of a rolling motion or sliding motion of a body part on a surface, and more specifically based on detection of the rolling motion or sliding motion based a print of the body part or multiple properties of a sleeve on the body part.

BACKGROUND

As the functionality in small mobile communication devices has increased, a demand for an increased functionality of user interfaces for these mobile communication devices has also increased. Users of these small mobile communication devices want the same functionality that is provided in non-mobile devices such as their personal computer. However, with the smaller screens that are pervasive in mobile communication devices, it has become increasingly more difficult to provide similar functionality.

Some systems have attempted to address this issue. For example, U.S. Patent Publication No. 2008/0158170 discloses a system that can provide multiple events based on a person touching/tapping an area on the screen with their fingernail versus tapping on the area with their skin. The system can detect different properties of the skin versus the properties of the fingernail. This system also discloses using a sleeve so that the system can distinguish between the sleeve and the skin of a person to generate multiple events when an area of the screen is touched using the sleeve.

The problem with this system is that it does not use prints of body parts such as fingerprints or different properties in the sleeve to detect a rolling motion of a body part such as a finger. Being able to detect a rolling motion of a body part such as a finger allows different types of events to be generated to provide some of the increased functionality that users are demanding from these mobile communication devices.

SUMMARY

The system and method are directed to solving these and other problems and disadvantages of the prior art. An optical scanner scans a first portion of a print of a body part, such as a finger, in a first area of an optical surface. The optical scanner detects a motion of the body part to a second area of the optical surface. This can be done in various ways. One way is for the optical scanner to detect a sliding motion of the body part to determine if most of the first portion of the print is in the second area. Another way is for the optical scanner to determine a rolling motion of the print based on a continuity of the print from the first area to the second area. A similar system and method is disclosed which detects a rolling motion of a body part by using a sleeve with multiple properties.

BRIEF DESCRIPTION OF THE DRAWINGS

These and other features and advantages of the system and method will become more apparent from considering the following description of an illustrative embodiment of the system and method together with the drawing, in which:

FIG. 4A is a top view looking at a surface for detecting a rolling motion of a sleeve with multiple properties.

FIG. 4B is a bottom view of a cutout of an exemplary sleeve with multiple properties.

DETAILED DESCRIPTION

Figure 1A:
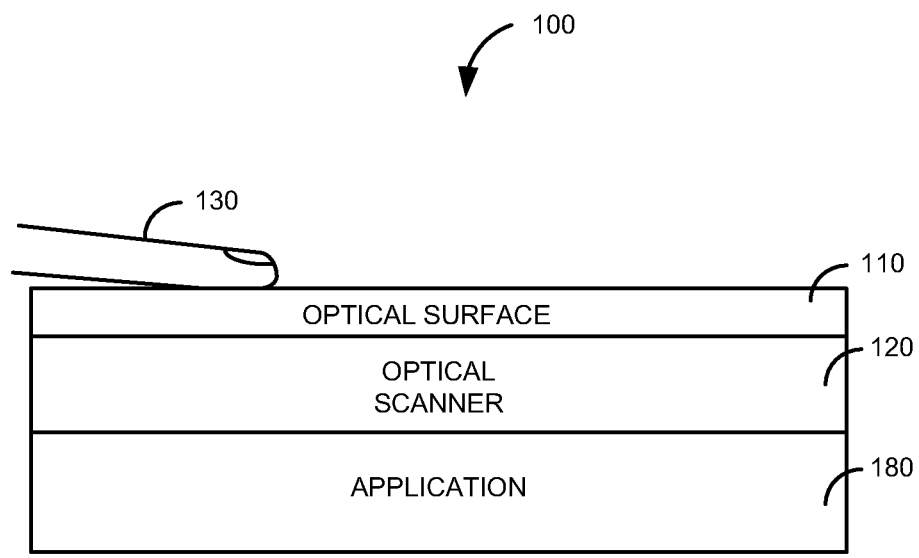
FIG. 1A is a block diagram of a first illustrative system for scanning a print of a body part to detect a rolling motion or sliding motion of the body part.

FIG. 1A is a block diagram of a first illustrative system 100 for scanning a print of a body part 130 to detect a rolling motion or sliding motion of the body part 130. The first illustrative system 100 comprises an optical surface 110, an optical scanner 120, and an application 180. The optical surface 110 can be any type of surface that the optical scanner 120 can scan through. For example, the optical surface 110 can be made of glass, plastic, or any material that allows the optical scanner 120 to scan a print of a body part 130. The optical surface 110 can be an optical surface 110 that allows the optical scanner 120 to scan through displayed objects/icons that are presented to a user. The optical surface 110 can be, for example, a touch screen, a computer screen, a mouse pad, a surface on a mouse, a surface on a joystick, a surface on a gaming controller, a surface on a button, a Liquid Crystal Display (LCD), and the like. The optical surface 110 can be part of the optical scanner 120. The body part 130 as shown in FIG. 1A is a finger; however, the body part 130 can be any body part 130 such as a thumb, a palm, a toe, and the like.

The optical scanner 120 can be any scanner that can detect a portion of a print of the body part 130 on or near an area of the optical surface 110. The optical scanner 120 can scan a portion of a print using different wave lengths and/or combinations of wave lengths such as visible light frequencies, ultra-violet frequencies, infra-red frequencies, and the like. The optical scanner 120 can scan at different light frequencies that are not blocked by displayed objects/icons. The optical scanner 120 can scan at different angles to allow for display of objects/icons through the optical surface 110 and/or embedded into the optical surface 110. The optical scanner 120 can include a processor, memory, a digital signal processor, and the like. The first illustrative system 100 can be implemented in a variety of devices such as a telephone, a cellular telephone, a Personal Digital Assistant (PDA), a gaming system or console, a Personal Computer (PC), a lap-top computer, a portable gaming device, a mouse, a joystick, a music system, and the like.

Figure 1B:
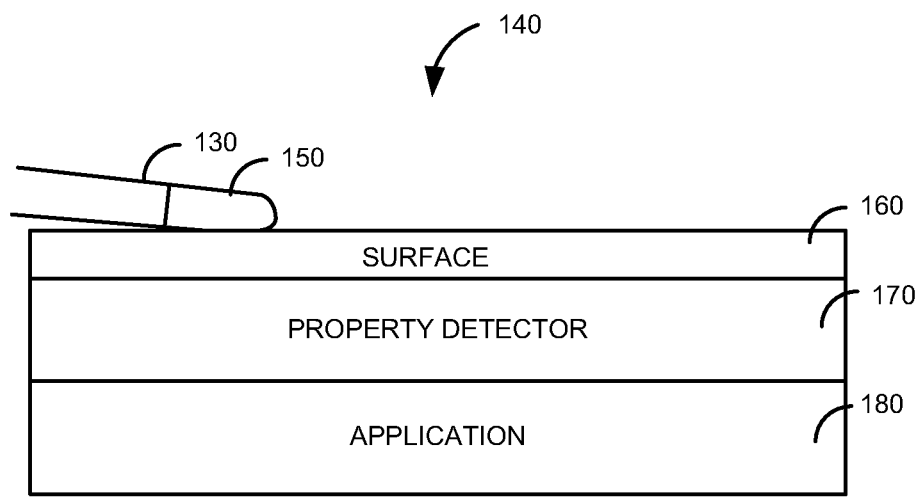
FIG. 1B is a block diagram of a second illustrative system for scanning a property of a sleeve with multiple properties to detect a rolling motion of the sleeve.

The application 180 can be any software application that can detect events generated/registered by the optical scanner 120 or the property detector 170 (see FIG. 1B). For example, the application 180 can be a word processing application, a gaming application, a spreadsheet, a telephony application, a calendar application, and the like.

FIG. 1B is a block diagram of a second illustrative system 140 for scanning a property of a sleeve 150 with multiple properties to detect a rolling motion of the sleeve 150. The second illustrative system 140 comprises a surface 160, a property detector 170, and the application 180. The surface 160 can be any type of surface that can detect different properties of the sleeve 150 that are well known in the art, such as those that detect capacitance, resistance, colors, and the like. The different properties can be different capacitances, different inductances, different resistances, different impedances, different colors, and the like. The different properties can be different combinations of the above properties. The surface 160 can be, for example, the optical surface 110, a touch screen, a computer screen, a mouse pad, a surface on a mouse, a surface on a joystick, a surface on a gaming controller, a surface on a button, and the like.

The property detector 170 can be any detector that can determine different properties of the sleeve 150. For example, the property detector 170 can be the optical scanner 120. The property detector 170 can scan the sleeve 150 to detect different wavelengths and/or combinations of wavelengths such as visible light frequencies, ultra-violet frequencies, infra-red frequencies, and the like. The property detector 170 can determine different properties in the sleeve 150 such as different capacitances, different inductances, different resistances, different impedances, and the like. The optical scanner 120 can include a processor, memory, a digital signal processor, and the like. The second illustrative system 140 can be implemented in a variety of devices such as a telephone, a cellular telephone, a Personal Digital Assistant (PDA), a gaming system, a Personal Computer (PC), a lap-top computer, a portable gaming device, a music system, a mouse, a joystick, and the like.

Figure 2B:
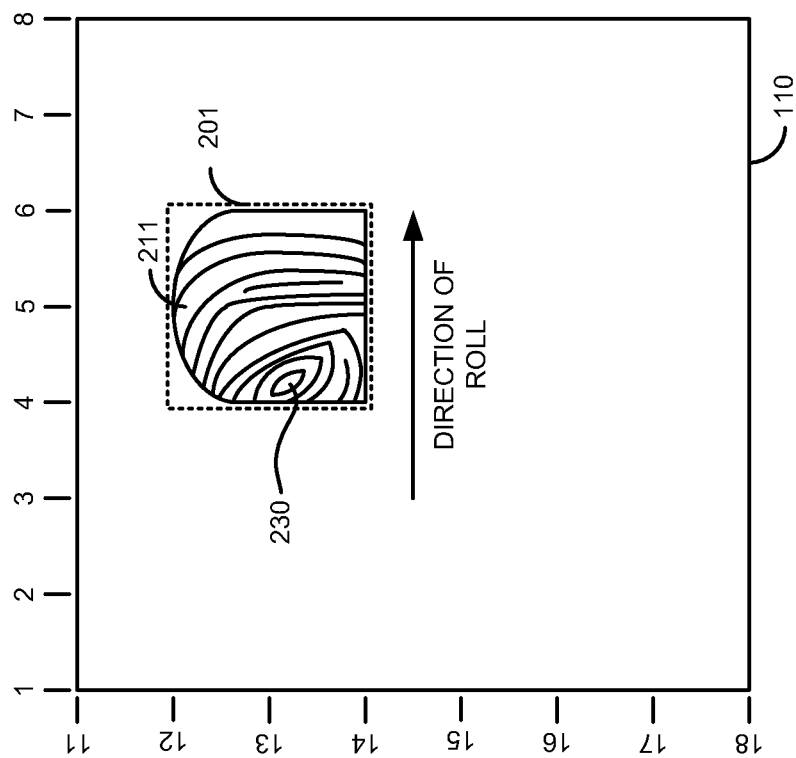
FIG. 2B is a bottom view looking up from under the optical surface for detecting a rolling motion of a body part on the optical surface.
Figure 2A:
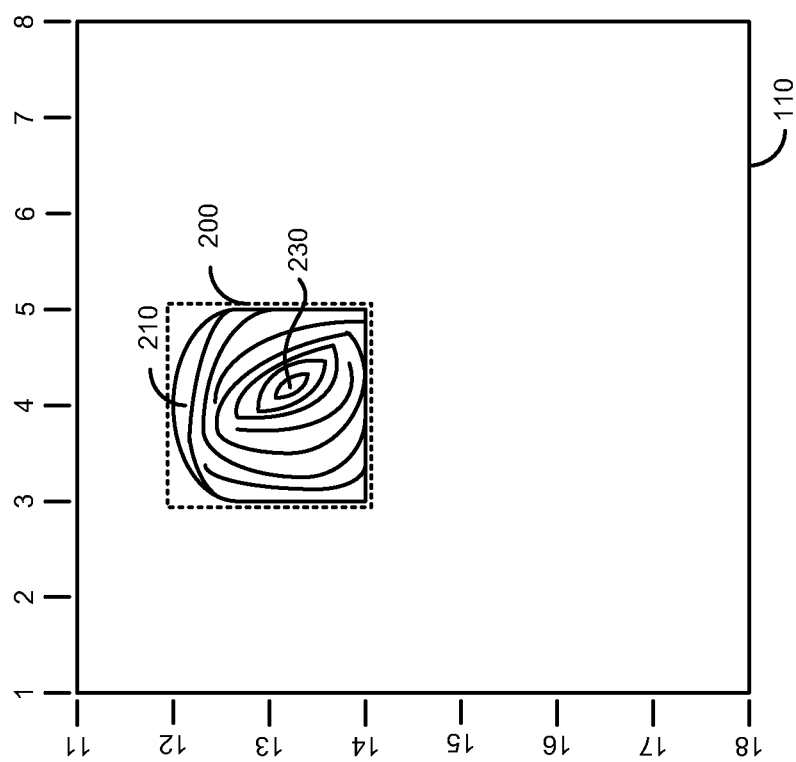
FIG. 2A is a bottom view looking up from under an optical surface for detecting a rolling motion of a body part on the optical surface.

FIGS. 2A-2B are a bottom view looking up from under the optical surface 110 for detecting a rolling motion of a body part 130 (e.g., a finger) on the optical surface 110. FIGS. 2A-2B display a view that would be seen by the optical scanner 120 when the optical scanner 120 scans the body part 130. In this example, a finger is the body part 130; however other body parts 130 can be used. In FIGS. 2A-2B, the numbers 1-8 and 11-18 represent a grid that is used to identify areas in the optical surface 110. The grid is just one example of a way to identify areas in the optical surface 110. In this example, a first fingerprint portion 210 is in area 200 (represented in the grid at 3-5/12-14). The first fingerprint portion 210 in area 200 is in this example where a person first touches the optical surface 110. The first fingerprint portion 210 contains unique identifiable ridges in the finger that comprise a fingerprint of the person. In this example, the fingerprint has an elliptical area 230 that is in grid area 4-5/13-14.

A second portion of the same fingerprint 211 is shown in FIG. 2B at grid coordinates 4-6/12-14 (second area 201). As the finger is rolled, the portion of the print in grid area 3-4/12-14 (in FIG. 2A) is no longer visible to the optical scanner 120, while most of the portion of the fingerprint in area 4-5/12-14 (from FIG. 2A) is still visible to the optical scanner 120 in FIG. 2B. In FIG. 2B, the second portion 211 of the fingerprint (e.g., now including a side of the fingerprint) is now visible to the optical scanner 120. The second portion of the fingerprint 211 comprises portions of the fingerprint that was initially in the first portion of the fingerprint 210 (in areas 4-5/12-14 in FIG. 1) and a new portion in area 5-6/12-14.

Note that the elliptical area 230 in FIG. 2A is still in the same area (4-5/13-14) in FIG. 2B. As the finger is rolled as shown in FIGS. 2A-2B, the ridges of the fingerprint are presented to the optical scanner 120 in a continuous manner. As the finger is rolled, new portions of the same ridges of the fingerprint are now in view of the optical scanner 120 in area 5-6/12-14 of the optical surface 110. This allows the optical scanner 120 to detect the rolling motion of the finger on or above the optical surface 110.

Even though some of the ridges in typical fingerprints stop at points, most of the ridges are continuous enough for the optical scanner 120 to detect the rolling motion of the finger on or above the optical surface 110. Because of the continuity of the fingerprint, the optical scanner 120 can detect the rolling motion without having to have scanned the fingerprint previously. The optical scanner 120 can detect a portion of a print that may be partially in contact with the optical surface 110 and partially above the optical surface 110.

In this example, to detect the rolling motion of the finger on the optical surface 110, the optical scanner 120 scans the first portion of the fingerprint 210 as the finger touches or comes close to the optical surface 110 in area 200. The optical scanner 120 detects a continuous rolling motion of the finger to the second area 201 by scanning the fingerprint in the second area 201. The optical scanner 120 detects the continuous rolling motion by scanning the ridges of the fingerprint and determining that the ridges continue with the rolling motion in a continuous manner. The optical scanner 120 can use the same process to detect a rolling of multiple fingerprints at the same time.

The optical scanner 120 can scan the print portions of the body part(s) 130 in different ways. For example, the optical scanner 120 can continuously scan areas on the optical surface 110, can scan in specific areas of the optical surface 110, can scan at different time intervals, can continuously scan during the rolling motion or sliding motion, and the like. The optical scanner 120 can comprise multiple optical scanners 120 that scan individual areas of the optical surface 110.

The example shown in FIGS. 2A-2B shows a rolling motion from left to right (as seen from the bottom). This system can detect other types of rolling motions such as: a rolling from a bottom of the finger to a tip of the finger, a rolling from the tip of the finger to the bottom of the finger, a rolling from the bottom of the finger to a side of the finger, a rolling from the side (either right or left side) of the finger to the bottom of the finger, and the like. The system can detect similar types of rolling motions of other body parts 130, such as toes, thumbs, palms, and the like.

Figure 3:
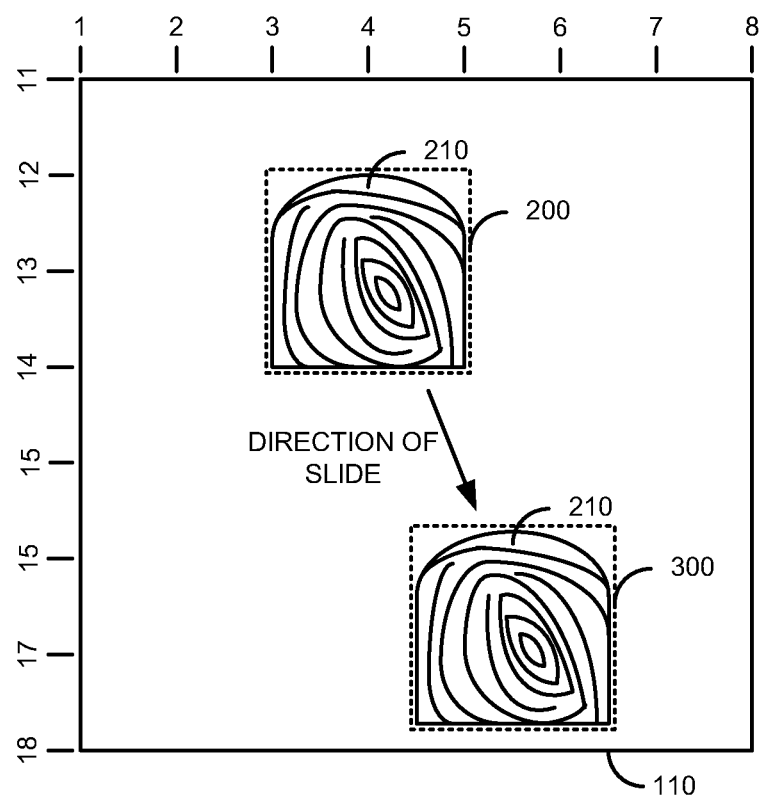
FIG. 3 is a bottom view looking up from under the optical surface for detecting a sliding motion of a body part on the optical surface.

FIG. 3 is a bottom view looking up from under the optical surface 110 for detecting a sliding motion of a body part 130 on the optical surface 110. FIG. 3 is a view that would be seen by the optical scanner 120 as a person slides a body part 130 across or above the optical surface 110. In this example, the body part 130 is a finger. The person initially touches the finger as described in FIG. 2A in area 200 of the optical surface 110. However, instead of rolling their finger, the person in this example slides their finger to area 300.

The optical scanner 120 scans the first portion of the fingerprint 210 in the first area 200 of the optical surface 110. The optical scanner 120 detects a sliding motion of the finger to area 300 of the optical surface 110. The optical scanner 120 detects the sliding motion of the finger to area 300 by comparing the scanned first fingerprint portion 210 in area 200 to the scanned first fingerprint portion in area 300 to determine if they are consistent (i.e., approximately the same). Since the fingerprint portions 210 in area 200 and 300 are the consistent, the optical scanner 120 can determine that the person slid their finger. When comparing the print portions in area 200 and area 300, the optical scanner 120 does not have to have an exact match. The optical scanner 120 can determine consistency of the match based on a percentage of matches of specific points in the fingerprint, different thresholds, and the like.

FIG. 4A is a top view looking down at a surface 160 for detecting a rolling motion of a sleeve 150. The sleeve 150 contains multiple properties. The sleeve 150 is shown on the body part 130. In this example, the body part 130 is a finger. The finger with the sleeve 150 can be placed in contact with or near the surface 160 so that the property detector 170 can detect the different properties in the sleeve 150.

FIG. 4B is a bottom view of a cutout of an exemplary sleeve 150. FIG. 4B is a cutout view of a sleeve 150 that goes on a finger. The view is from the bottom looking up to the bottom of the finger that has the sleeve 150 on. In this example, the sleeve 150 has four areas that contain different properties 411-414. Property 414 covers the tip of the finger. Property 412 covers the bottom of the finger (non-fingernail side). Property 413 covers the left side of the finger (looking from the bottom). Property 411 covers the right side of the finger (looking from the bottom).

In FIG. 4B, the properties 411-414 are shown in a square pattern. The properties can be organized in various ways such as a circular shape, a shape conforming to the finger, a triangular shape, or various combinations of these, and the like. There can be more or less properties 411-414 in an area of the sleeve 150. The properties 411-414 can be closer together or further apart. The properties 411-414 can be different properties such as: a capacitive property, an inductive property, an impedance property, a resistive property, a color, or combinations of these, and the like.

Figure 5B:
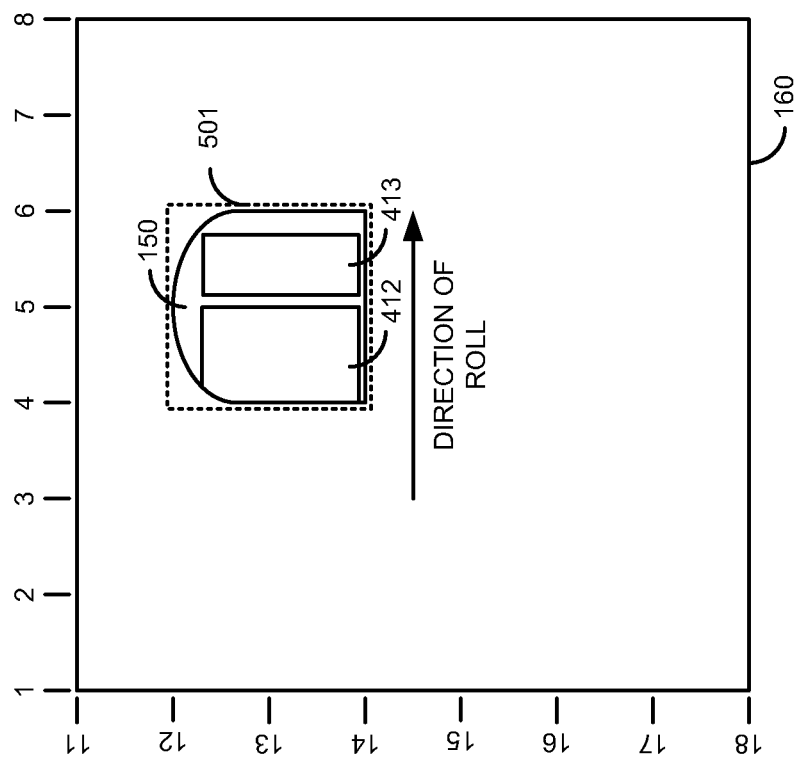
FIG. 5B is a bottom view looking up from under the surface for detecting a rolling motion of the sleeve with multiple properties.
Figure 5A:
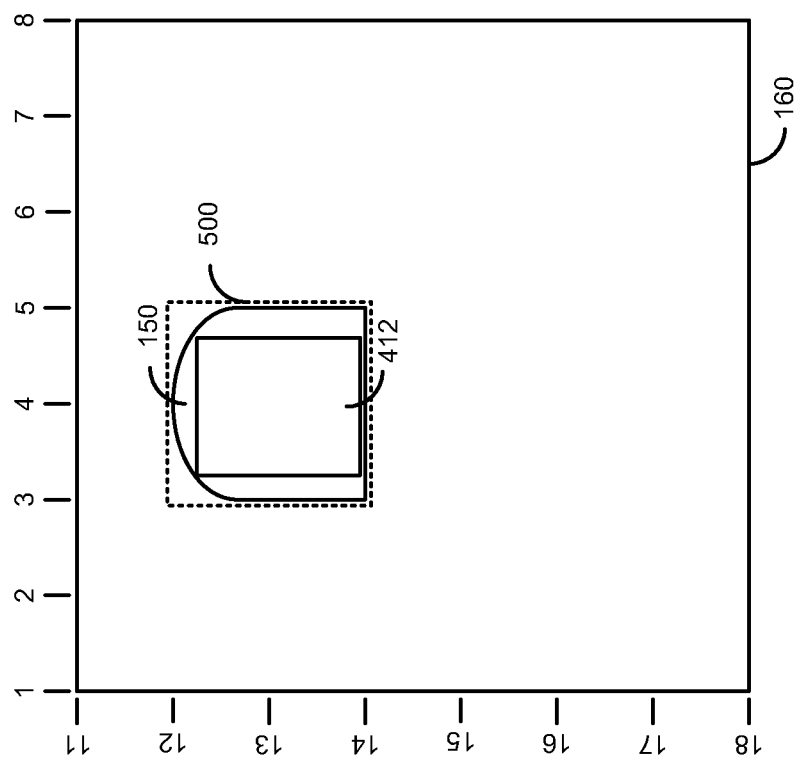
FIG. 5A is a bottom view looking up from under a surface for detecting a rolling motion of the sleeve with multiple properties.

FIG. 5A is a bottom view looking up from under the surface 160 for detecting a rolling motion of the sleeve 150. The sleeve 150 contains multiple different properties 411-414. FIG. 5A is a view that would be seen by the property detector 170 when the property detector 170 detects different properties in the sleeve 150. In FIGS. 5A-5B, the numbers 1-8 and 11-18 represent a grid that is used to identify areas in the surface 160. In this example, property 412 of the sleeve 150 is in area 500 of the surface 160.

FIG. 5B is a bottom view looking up from under the surface 160 for detecting a rolling motion of the sleeve 150. FIG. 5B is a view that would be seen by the property detector 170 when the property detector 170 detects different properties in the sleeve 150. As a person with the sleeve 150 on their finger rolls their finger (in the right direction looking from the bottom), property 412 is now only partially exposed to the property detector 170 in area 4-5/12-14. Property 413 is now exposed to the property detector 170 in area 5-6/12-14. Both properties 412 and 413 are now in area 501.

The property detector 170 identifies property 412 of the sleeve 150 in area 500 of the surface 110. The property detector 170 detects a rolling motion of the sleeve 150 to the area 501 by identifying property 413 in area 501. The rolling motion of the sleeve 150 from area 500 to 501 is detected based on a continuity of property 412 and property 413. The continuity of properties can be detected by the property detector 170 in different ways. For example, the property detector 170 can be programmed to know that property 413 is adjacent to property 412 on the sleeve 150. A second way that the property detector 170 can detect that there is a continuity of the properties is to know what the difference is between adjacent properties.

Figure 6B:
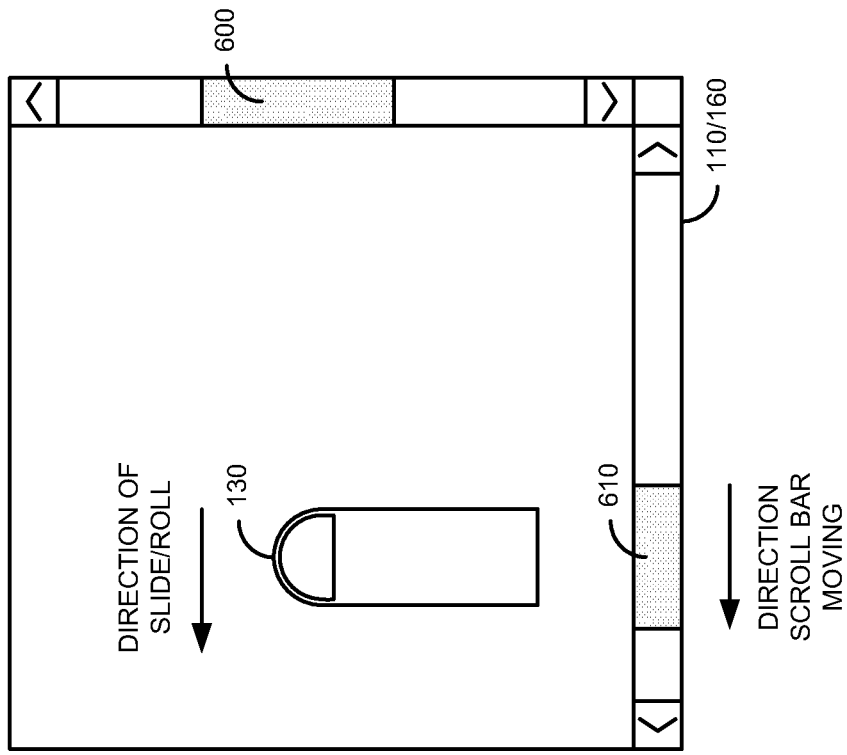
FIG. 6B is an exemplary top view of a surface or optical surface that shows the generation of an event for use by an application when a rolling or sliding motion is detected.
Figure 6A:
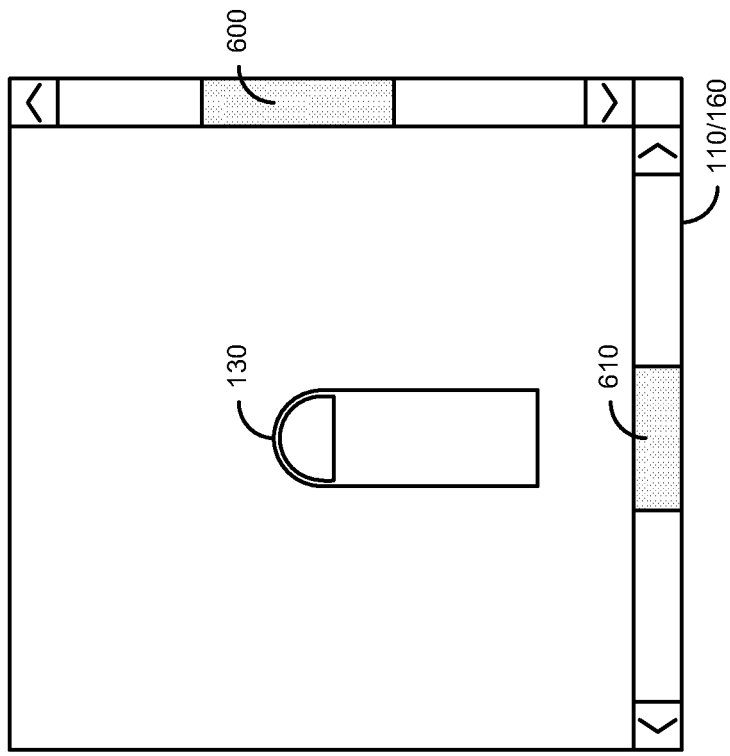
FIG. 6A is an exemplary top view of a surface or optical surface that shows the generation of an event for use by an application when a rolling or sliding motion is detected.

FIGS. 6A-6B are an exemplary top view of a surface 160 or optical surface 110 that shows the generation of an event for use by an application 180 when a rolling or sliding motion is detected. FIGS. 6A-6B show an example application 180 that uses scroll bars (600, 610). The application 180 has a vertical scroll bar 600 and a horizontal scroll bar 610.

When a rolling or sliding motion of the body part 130 (or body part 130 with the sleeve 150 on) is scanned/identified by the optical scanner 120 or the property detector 170, an event (or multiple events) is generated that can be used by the application 180. In this example, there are four different kinds of events that can be generated: scroll up, scroll down, scroll left, and scroll right.

FIG. 6B shows the rolling or sliding motion of the body part 130 from right to left. When the rolling or sliding motion of the body part 130 from right to left is detected, the horizontal scroll bar 610 moves from right to left based on generation of the scroll left event. In this example, the event could be a series of events to allow the movement of the horizontal scroll bar from right to left at a similar speed to the body part 130. A similar event can also be used to move the horizontal scroll bar 610 from left to right based on a rolling or sliding motion from left to right. Similar events could also be used to move the vertical scroll bar 600 up and down based on a rolling or sliding of the body part 130 either up or down. If the body part 130 is moved in a diagonal manner, events can be generated to move both the vertical scroll bar 600 and the horizontal scroll bar 610 at the same time. In addition to scroll events, other types of events can be generated based on detection of a rolling or sliding motion such as generating a tooltip, selecting a text, providing a menu, moving a cursor, switching from upper case to lower case, switching from lower case to upper case, providing a help text, and the like.

Figure 7:
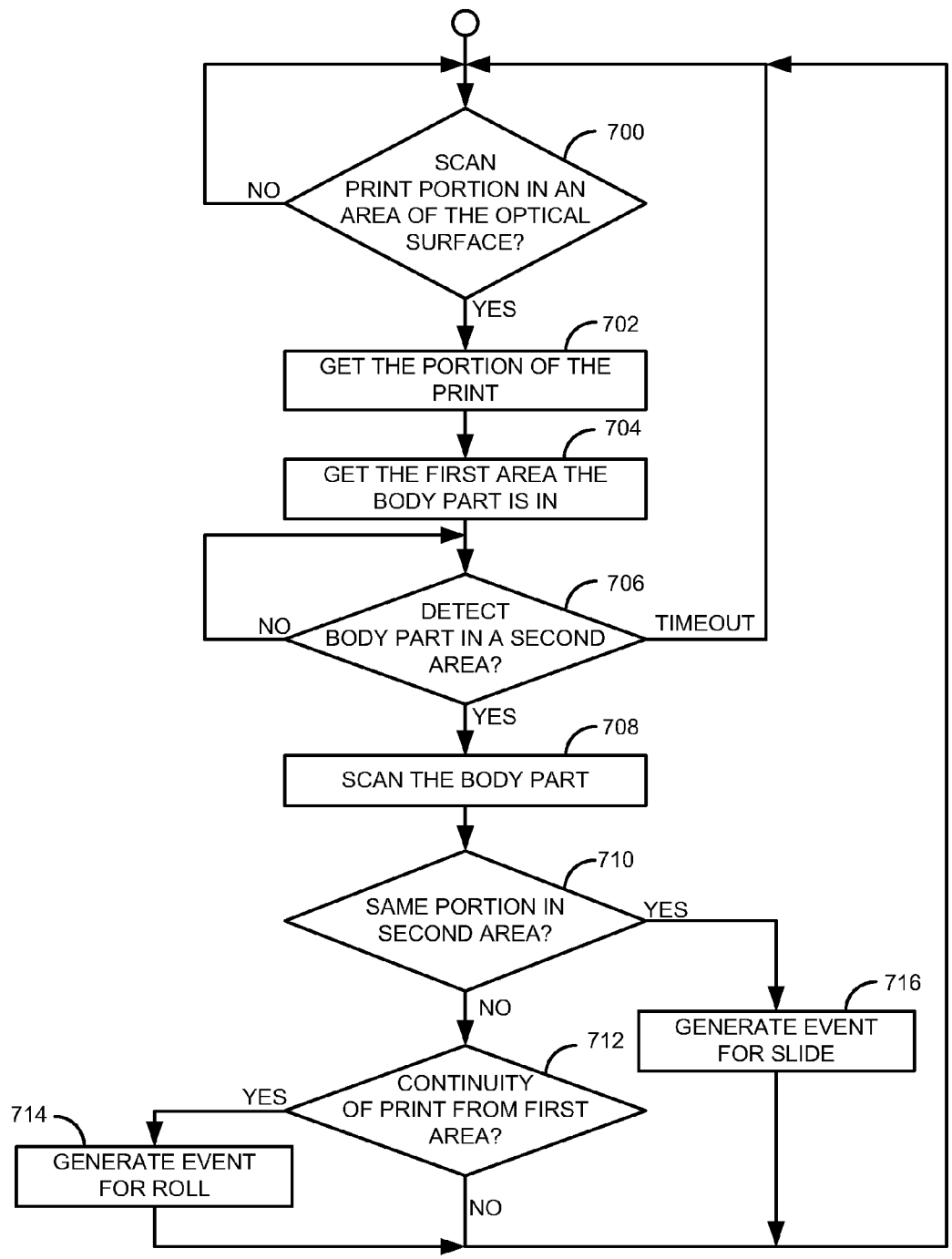
FIG. 7 is a flow diagram of a method for scanning a print of a body part to detect a sliding or rolling motion of the body part on an optical surface.

FIG. 7 is a flow diagram of a method for scanning a print of a body part 130 to detect a sliding or rolling of the body part 130 on or above an optical surface 110. Illustratively, the optical scanner 120, the property detector 170, and the application 180 comprise a stored-program-controlled entity, such as a computer or processor, which performs the method of FIGS. 7-8 by executing a program stored in a storage medium, such as a memory or disk.

The optical scanner 120 scans 700 for a first portion of a print of a body part 130 in a first area of the optical surface 110. If no first portion of the print is scanned in step 700, the process repeats step 700. If the first portion of a print is scanned in step 700, the optical scanner 120 gets 702 the first portion of the print. The optical scanner 120 gets 704 the first area of the optical surface 110 that the first portion of the print of the body part 130 is in.

The optical scanner 120 determines if it can detect in step 706 a motion of the body part 130 to a second area of the optical surface 110. If the optical scanner 120 cannot determine that a body part 130 is in a second area of the optical surface 110 in step 706, the optical scanner 120 repeats step 706. If a timeout value is exceeded in step 706 and a body part 130 is not detected in the second area, the process goes back to step 700. Otherwise, if a body part 130 is detected in a second area of the optical surface 110 in step 706, the optical scanner 120 scans 708 the body part 130 in the second area of the optical surface 110.

The optical scanner 120 determines in step 710 if the same portion of the print that was in the first area of the optical surface 110 is now in the second area of the optical surface 110. If the same portion of the print that was in the first area is now in the second area of the optical surface 110, an event is generated 716 for the sliding motion that can be used by application 180. If the same portion of the print that was in the first area is not in the second area in step 710, the process goes to step 712. The optical scanner 120 determines in step 712 if there is a continuity of the print from the first area to the second area in the optical surface 110. If there is a continuity of the print from the first area to the second area in the optical surface 110 in step 716, an event is generated 714 for the rolling motion and the process goes to step 700. Otherwise, if there is not a continuity of the print from the first area to the second area of the optical surface 110 in step 712, the process goes to step 700.

Figure 8:
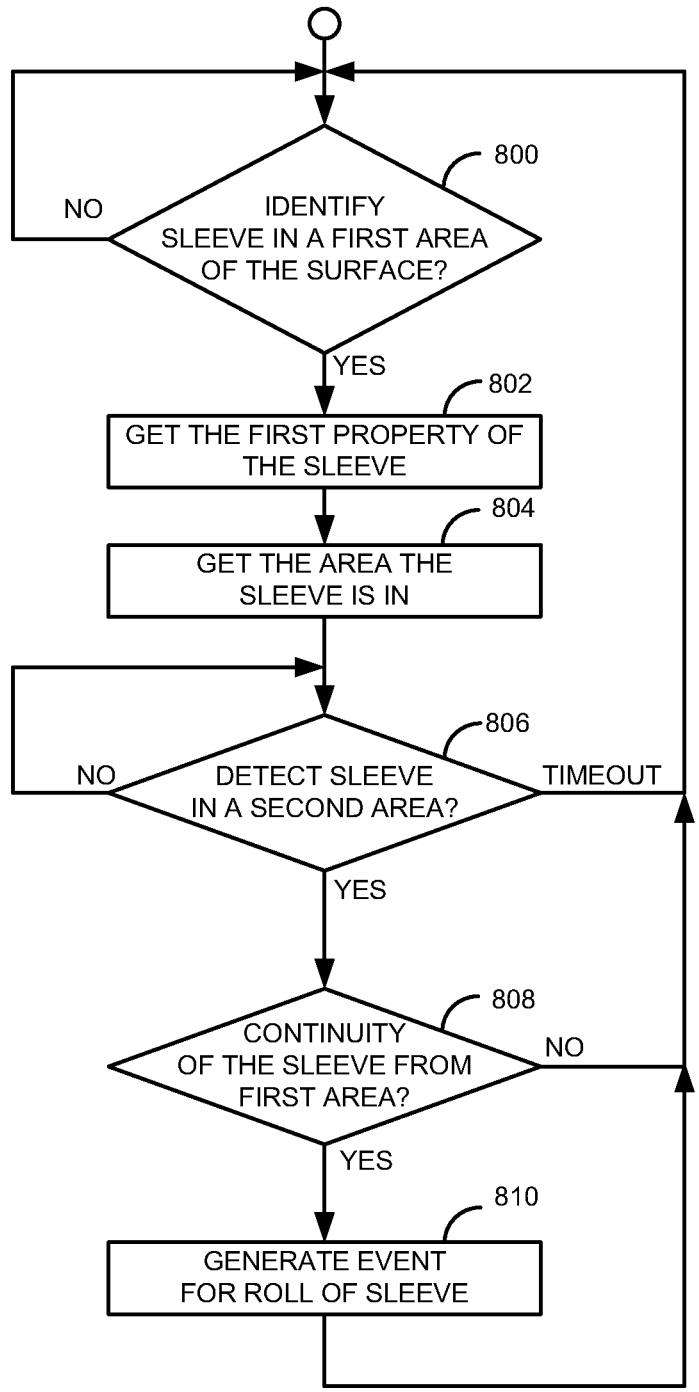
FIG. 8 is a flow diagram of a method for detecting a rolling motion of a sleeve with multiple properties on a surface.

FIG. 8 is a flow diagram of a method for detecting a rolling motion of a sleeve 150 with multiple properties on a surface 160. The process begins when the property detector 170 determines in step 800 if it has identified the sleeve 150 in a first area of the surface 160. If the property detector 170 has not identified the sleeve 150 in the first area of the surface 160 in step 800, step 800 is repeated. Otherwise, if the property detector 170 detects the sleeve 150 in the first area of the surface 160 by identifying a first property 411-414 of the sleeve 150 in step 800, the process goes to step 802.

The property detector 170 gets 802 the first property/properties 411-414 of the sleeve 150 in the first area of the surface 160. The property detector 170 gets 804 the first area that the sleeve 150 is in. The property detector 170 detects in step 806 if there is a rolling motion of the sleeve 150 to a second area of the surface 160. If the property detector 170 does not detect a rolling motion of the sleeve 150 to the second area of the surface 160 in step 806, the process stays in step 806. If the property detector 170 does not detect a rolling motion of the sleeve 150 to the second area of the surface 160 in step 806 and there has been a timeout, the process goes to step 800.

Otherwise, if the property detector 170 detects the rolling motion of the sleeve 150 to the second area of the surface 160 in step 806, the property detector 170 detects in step 808 if the rolling motion is based on a continuity of the sleeve 150 from the first area to the second area of the surface 160. If there is not a continuity of the first property to the second property from the first area to the second area in step 808, the process goes to step 800. Otherwise, if there is a continuity of the first property to the second property from the first area to the second area in step 808, an event is generated 810 for the rolling motion of the sleeve 150. The event can then be used by the application 180 to perform a function. The process then goes to step 800.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    scanning a first portion of a print of a body part in a first area of an optical surface;
    detecting whether a motion of the body part to a second area of the optical surface is a continuous rolling motion or a continuous sliding motion; wherein detecting a continuous sliding motion of the body part on the optical surface comprises determining if the first portion of the print of the body part in the first area of the optical surface is consistent with a scanned portion of the print of the body part in the second area of the optical surface; wherein detecting a continuous rolling motion of the body part on the optical surface comprises determining if there is a continuity of the print between the first area and the second area; and
    generating one or more of: (i) a continuous rolling motion event when the detected motion is a continuous rolling motion and (ii) a continuous sliding motion event when the detected motion is a continuous sliding motion.

2. The method of claim 1, wherein the motion is a continuous rolling motion of the body part on the optical surface.

3. The method of claim 2, wherein the body part is a finger and the continuous rolling motion is one of the following: rolling from a bottom of the finger to a tip of the finger, rolling from the tip of the finger to the bottom of the finger, rolling from the bottom of the finger to a side of the finger, and rolling from the side of the finger to the bottom of the finger.

4. The method of claim 1, wherein the motion is a continuous sliding motion of the body part on the optical surface.

5. The method of claim 1, wherein the body part is one of the following: an individual finger, a plurality of fingers, a thumb, a palm, and a toe.

6. The method of claim 1, wherein the event is at least one of the following: scrolling in a direction of the motion, generating a tooltip, providing a menu, switching from upper case to lower case, switching from lower case to upper case, and providing a help text.

7. The method of claim 1, wherein the optical surface is at least one of the following: a touch screen, a computer screen, a mouse pad, a surface on a mouse, a surface on a joystick, a surface on a gaming controller, and a surface on a button.

8. A system comprising:
    an optical scanner configured to scan a first portion of a print of a body part in a first area of an optical surface, and detect whether a motion of the body part to a second area of the optical surface is a continuous rolling motion or a continuous sliding motion, wherein detecting a continuous rolling motion of the body part on the optical surface comprises determining if there is a continuity of the print between the first area and the second area, wherein detecting a continuous sliding motion of the body part on the optical surface comprises determining if the first portion of the print of the body part in the first area of the optical surface is consistent with a scanned portion of the print of the body part in the second area of the optical surface; and a property detector that detects continuity of the print from the first area of the optical surface to the second area of the optical surface, wherein one or more of the optical scanner and the property detector generate one or more of: (i) a continuous rolling motion event when the detected motion is a continuous rolling motion and (ii) a continuous sliding motion event when the detected motion is a continuous sliding motion.

9. The system of claim 8, wherein the motion is a continuous rolling motion of the body part on the optical surface.

10. The system of claim 9, wherein the body part is a finger and the continuous rolling motion is one of the following: rolling from a bottom of the finger to a tip of the finger, rolling from the tip of the finger to the bottom of the finger, rolling from the bottom of the finger to a side of the finger, and rolling from the side of the finger to the bottom of the finger.

11. The system of claim 8, wherein the motion is a continuous sliding motion of the body part on the optical surface.

12. The system of claim 8, wherein the body part is one of the following: an individual finger, a plurality of fingers, a thumb, a palm, and a toe.

13. The system of claim 8, wherein the event is at least one of the following: scrolling in a direction of the motion, generating a tooltip, selecting a text, providing a menu, moving a cursor, switching from upper case to lower case, switching from lower case to upper case, and providing a help text.

14. The system of claim 8, wherein the optical surface is at least one of the following: a touch screen, a computer screen, a mouse pad, a surface on a mouse, a surface on a joystick, a surface on a gaming controller, and a surface on a button.

\* \* \* \* \*